United States Patent [19]
McCusker et al.

[11] Patent Number: 6,031,601
[45] Date of Patent: Feb. 29, 2000

[54] CODE-SPACE OPTICAL ELECTRONIC DISTANCE METER

[75] Inventors: Michael V. McCusker, Los Altos; James L. Sorden, Saratoga, both of Calif.; Peter Raby, London, United Kingdom

[73] Assignee: Trimble Navigation Limited, Sunnyvale, Calif.

[21] Appl. No.: 09/112,022

[22] Filed: Jul. 8, 1998

[51] Int. Cl.[7] ...................................................... G01C 3/08
[52] U.S. Cl. .......................... 356/5.01; 356/5.1; 356/5.05; 356/5.15; 342/145
[58] Field of Search ................................... 356/5.01, 5.1, 356/5.05, 5.15; 342/145

[56] References Cited

U.S. PATENT DOCUMENTS

| | | |
|---|---|---|
| 3,720,468 | 3/1973 | Skagerlund . |
| 3,802,775 | 4/1974 | Hughes . |
| 3,802,780 | 4/1974 | Helm et al. . |
| 4,025,193 | 5/1977 | Pond et al. . |
| 5,026,156 | 6/1991 | Bayston et al. . |
| 5,077,557 | 12/1991 | Ingensand ................................. 342/52 |
| 5,117,232 | 5/1992 | Cantwell ................................. 342/357 |
| 5,175,557 | 12/1992 | King et al. ............................... 342/357 |
| 5,233,357 | 8/1993 | Ingensand et al. ..................... 342/352 |
| 5,311,149 | 5/1994 | Wagner et al. ......................... 331/1 A |

*Primary Examiner*—Stephen C. Buczinski
*Attorney, Agent, or Firm*—Thomas E. Schatzel; Law Offices of Thomas E. Schatzel, A Prof. Corp.

[57] ABSTRACT

An electronic distance meter comprises an integrated circuit from a GPS navigation receiver having a local pseudo-random number code generator for code demodulation that is connected to modulate either a polychromatic or a monochromatic light source. An optical system focuses the light on a distant target with an unknown range. Reflections from the distant target are focused on a light detector that produces a phase-delayed copy of the original pseudo-random number code. The time-of-flight to and back from the distant target is a function of the distance. The GPS receiver integrated circuit computes the range based on the code-phase delay to a precision better than one centimeter. The position of a remote target can be triangulated from several electronic distance meters each having known positions, e.g., determined by included GPS navigation receivers. Conversely, the position of a single electronic distance meter can be determined by triangulation by ranging to several remote targets each having known positions.

6 Claims, 2 Drawing Sheets

CODE-SPACE OPTICAL ELECTRONIC DISTANCE METER

BACKGROUND OF THE INVENTION

1. Field of the Invention

The invention relates generally to survey equipment and navigation systems and more specifically to the use of pseudo-random number code modulated light beams and receivers to detect and range the reflected light with navigation receiver integrated circuits.

2. Description of the Prior Art

Land surveyors have used optical equipment to measure distances between points for a century or more. Electronic distance measuring devices have been in use for many years that use the contrast in phase changes of several beams of light or the time it takes a pulse of laser light to reach a target and return to measure difference. Such techniques use the frequency space or time space to make such measurements.

The accuracy of electronic distance measurement equipment is derived from an internal reference frequency source, e.g., a crystal oscillator. But such crystal oscillators can drift over time and with age. Exposure to extreme environments can also upset delicate calibrations of the reference frequency source, both short term and long term. Therefore, EDM equipment should be regularly calibrated by using it to measure a known length.

Long-range electronic distance meters, e.g., ranges over five kilometers, typically use microwave signals for measurement. Short range electronic distance meters often use infrared light. See, Rueger, J. M., *Electronic Distance Measurement—An Introduction,* Springer Verlag, Berlin, third edition, 1990. Both the long-range and short-range EDM's use pulse or phase comparison methods to determine the distance between instrument and a remote target. However, the phase comparison method is more commonly used for survey instruments.

The pulse technique is based on timing the signal travel time to and from a distant reflector. The velocity of the signal is assumed to be known. For phase comparison, the phase difference of signals is observed at several frequencies. The unambiguous distance between the target and the instrument is resolved using phase difference observations. But in all cases, the basis for measurement precision depends on the accuracy of the stand-alone reference frequency source.

Ingensand, et al., describe in U.S. Pat. No. 5,233,357, issued Aug. 3, 1993, a terrestrial surveying system that has an electro-optic total station connected to a satellite position-measuring system. A GPS receiver can be mounted directly to the total station and thereby determine the position of the total station. The angle and distance from the total station to aiming points "can be determined by conventional surveying methods". Coordinate transformation from the satellite system to a terrestrial measurement is done by a computer.

Such total station is described in more detail in U.S. Pat. No. 5,077,557, issued Dec. 31, 1991, to Ingensand. An ultrasonic electro-optical range finder is included with a GPS receiver in each total station. Such total stations allow points to be measured with the combination of the range finder and GPS receiver that are not directly accessible to the GPS receiver alone. The coordinates of such points to be surveyed are determined unambiguously by means of an arc intersection method. Two or more total stations can be used on the same survey point to advantage, e.g., to increase confidence by redundant measurements.

SUMMARY OF THE PRESENT INVENTION

It is therefore an object of the present invention to provide an electronic distance meter that is economical and accurate.

It is a further object of the present invention to provide an electronic distance meter that can share some of the complex integrated circuits developed for GPS navigation receivers.

It is a still further object of the present invention to provide an electronic distance meter that relies on an atomic clock for its fundamental accuracy.

Briefly, an electronic distance meter embodiment of the present invention comprises an integrated circuit from a GPS navigation receiver having a local pseudo-random number code generator for code demodulation that is connected to modulate either a polychromatic or a monochromatic light source. An optical system focuses the light on a distant target with an unknown range. Reflections from the distant target are focused on a photodetector that produces a phase-delayed digital electronic copy of the original pseudo-random number code. The time-of-flight to and back from the distant target is a function of the distance. The GPS receiver integrated circuit computes the range based on the code-phase delay to a precision better than one centimeter. The position of a remote target can be triangulated from several electronic distance meters each having known positions, e.g., determined by included GPS navigation receivers. Conversely, the position of a single electronic distance meter can be determined by triangulation by ranging to several remote targets each having known positions.

It is an advantage of the present invention that an electronic distance meter is provided that is economical and accurate.

It is a further advantage of the present invention that an electronic distance meter is provided that can share some of the complex integrated circuits developed for GPS navigation receivers.

It is a still further advantage of the present invention that an electronic distance meter is provided that relies on an atomic clock for its fundamental accuracy.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
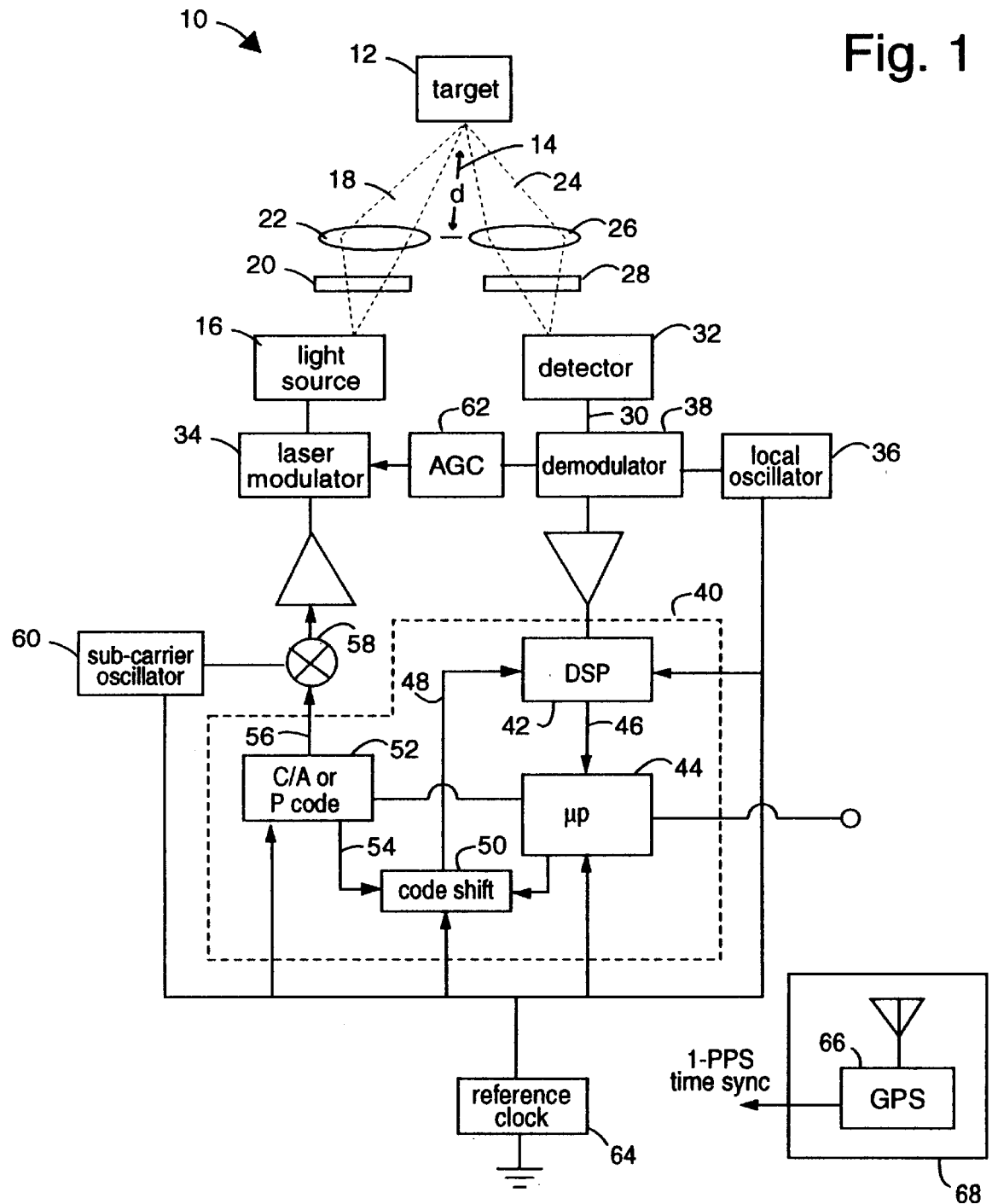
FIG. 1 is a block diagram of an electronic distance meter embodiment of the present invention.

FIG. 1 illustrates an electronic distance meter (EDM) system embodiment of the present invention, referred to by the general reference numeral 10. A target 12 that is reflective to light has an unknown distance ("d") 14. The EDM system 10 comprises laser light emitter 16 that produces a beam of light 18 that is optically conditioned, e.g., by a color filter 20 and lens 22, and directed to the target 12. A reflected light 24 is focused and filtered by a lens 26 and color filter 28 before being converted into an electronic signal 30 by a photodetector 32.

The light beam 18 is modulated by a modulator 34 that impresses a subcarrier with a code division multiple access (CDMA) signal and direct sequence spread spectrum (DSSS) techniques. Such CDMA modulation is preferably patterned after the conventional coarse/acquisition (C/A) code used for the L1-carrier in the global positioning system (GPS). Alternatively, the precision-code (P-code) used on the GPS L2-carrier could also provide good results (and the carrier frequency would have to increase to about 20 MHz).

The reflected signal 24 is stripped off of the laser light carrier by detector 32 and superheterodyned by a local oscillator (LO) 36 to produce an intermediate frequency (IF) in a demodulator 38. The IF is preferably in the range of 0.100–3.00 MHz to facilitate the operation of digital samplers with an integrated circuit (IC) 40 that includes a digital signal processor (DSP) 42. An advantage could be obtained by designing the frequency plan and modulation for system 10 to suit commercial and readily available GPS-CDMA-DSSS-type integrated circuit devices for GPS navigation receivers.

A microprocessor 44 finds a correlation peak for despreading operations in a signal 46 by adjusting the code phase delay of a despreading code signal 48 from a code shifter 50. A code phase search is conducted by the microprocessor 44 that resembles the processes used in GPS navigation receivers to acquire satellite lock. The magnitude of code phase delay that must be injected by the code shifter 50 is directly related to the time-of-flight for light beam 18 and the reflection 24.

A code generator 52 supplies the code shifter 50 with a sample 54 of a transmitter modulation signal 56 applied to a mixer 58. An oscillator 60 provides the 5.00 MHz subcarrier to the mixer 58. A composite signal is then passed to the laser modulator 34 for transmission.

The transmitter modulation signal 56 has a pattern that does not repeat in the short time the light needs to reach the target and return. At the same time, the "chip" rate of the code needs to be fast enough to allow sufficient resolution of the range to target 12 for a particular application. The inverse of the chip rate times the speed of light in air is more or less the linear granularity in range that can be resolved. This makes it possible for pattern matching techniques, e.g., CDMA-DSSS code correlation, to be used to recognize each phrase of the modulation as it is received back. The range to the target 12 is thus directly obtainable as in GPS navigation receivers.

Preferably, an automatic gain control (AGC) 62 is included and connected to automatically increase or decrease the light power output of the light emitter 16 to keep the photodetector signal output 30 relatively constant. In alternative embodiments, the light 18 and 24 may comprise polychromatic light or monochromatic light, e.g., laser light. For example, the light emitter 16 comprises a light emitting diode (LED) or laser diode. The filter 20 and lens 22 may be used to improve the intensity and characteristics of the light 18 falling on the target 12. The lens 26 may be included to collect reflected light 24 to improve the signal output of the detector 32. The filter 28 may be included to filter out unwanted background or stray light, or to reduce cross-talk from adjacent channels in a frequency-division multiplex arrangement. The lights 18 and 24 may be collinear and share the same lenses and filters for particular applications.

The modulator 34 drives the laser light emitter 16 according to a pseudo-random number (PRN) code sequence, preferably mimicking one of the limited number of PRN codes transmitted by conventional orbiting global positioning system (GPS) satellites maintained by the United States. Such GPS satellites conventionally transmit a coarse acquisition (C/A) code having a code length of 1023 chips transmitted at a rate of 1.023 Mbits/sec., and a precision (P) code having a code length of $5^{10}$ chips transmitted at a rate of 10.23 Mbits/sec.

The DSP 42 essentially comprises in-phase (I) and quadrature phase (Q) samplers and code correlators, as is conventional in commercial satellite navigation receivers for the demodulation of direct sequence spread spectrum signals from the GPS satellites. For example, see U.S. Pat. No. 5,117,232, issued May 26, 1992, to R. Cantwell, which is incorporated herein by reference. Alternatively, the DSP 42 provides the particular code and code-phase to use to the modulator 34. The DSP 42 uses the relative energies in the I and Q samples and the code correlation to establish a lock in phase to the received code from the photodetector 32. The phase difference between the received code and the transmitted code is converted into a measurement of the time-of-flight delay "t" to the target 12 and back. The distance "d" is computed according to, $d=ct/2$, where "c" is the speed of light, e.g., in air. Code searching and code-phase locking with distance calculations following are conventional and well-known to artisans of GPS navigation systems. In the EDM system 10, the situation is simplified because the effective carrier, the light 18 and 24, is not subject to significant or any Doppler shifting, which causes uncertainties in the carrier frequency transmitted by GPS satellites orbiting at high velocities. But Doppler shifting could be detected if the target 12 has a relative velocity and it is important to gauge such velocity.

A precision reference clock 64 is used to drive all the timing-critical signals to the whole of EDM system 10. If external time-standards are available, they are connected to discipline the precision reference clock 64 to improve overall system range measurement accuracy.

The DSP 42 preferably resolves the time-of-flight delay "t" to within tens of picoseconds so that the distance "d" may be determined to within less than a centimeter. To do this, the time base and oscillator stability of the DSP 42 and modulator 34 must be of high quality. Such accuracy can be obtained from a one-pulse-per-second (1-PPS) output 66 of a conventional GPS navigation receiver 68 that is applied to the precision reference clock 64. Because the GPS satellites being tracked base their signals on atomic clocks, derivative clocks can be used to provide an exceptionally accurate time base for the generation of the PRN code from the code generator 52. Accurate clocks are preferably used in the determination of the time-of-flight delay "t" to and from the target 12.

Figure 2:
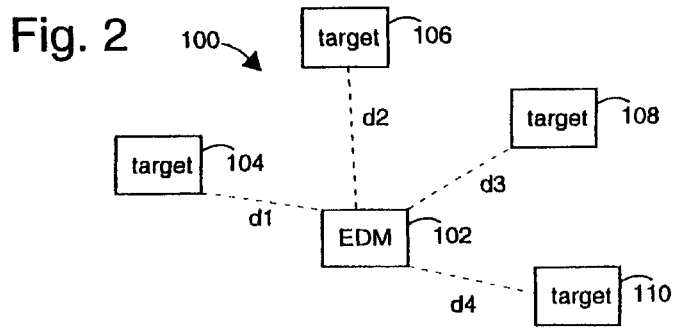
FIG. 2 is a configuration diagram of a single electronic distance meter embodiment of the present invention set up to find the range distance to several remote targets.

FIG. 2 illustrates a configuration 100 in which an electronic distance meter (EDM) 102, similar to EDM system 10 (FIG. 1), is within sight of a number of targets 104, 106, 108, and 110. In a situation in which each target 104, 106, 108, and 110 has a position known to the EDM system 10, the position of the EDM 102 is determined by measuring the distances d1, d2, d3, and d4, sequentially to each target, using code division multiplex access (CDMA).

Conventional devices are commercially-available for DSP 42 that routinely operate in CDMA environments, e.g., GPS navigation service. For example, the MAXWELL DSP is included in many navigation receivers and land-survey instruments marketed by Trimble Navigation (Sunnyvale, Calif.). A single such DSP maybe used to simultaneously process each of the several CDMA channels. Such a situation parallels the tracking of more than one GPS satellite. The position of EDM 102 is then determined by a simple process of simultaneous solutions of equations, using techniques well known in the GPS arts.

Figure 3:
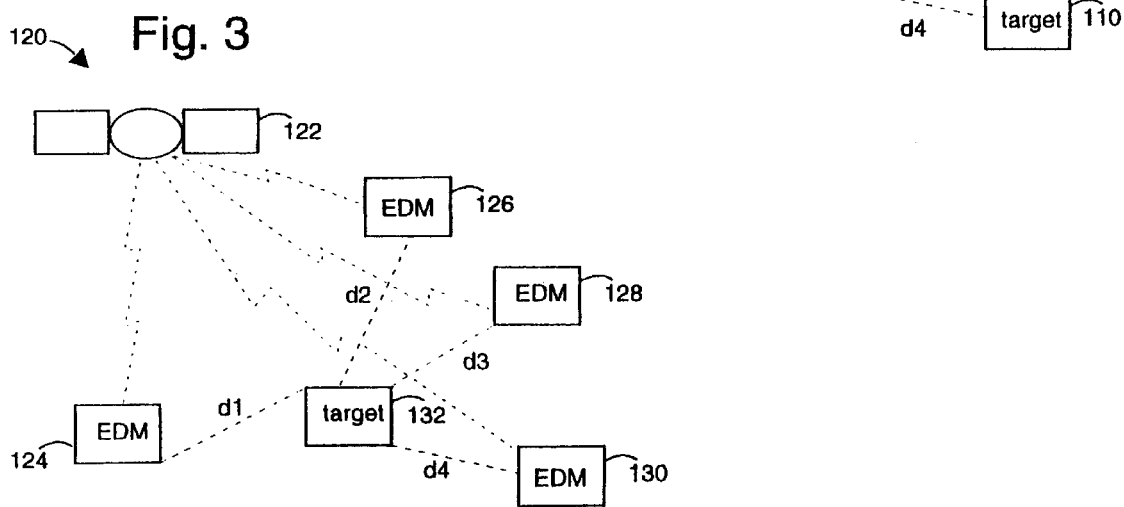
FIG. 3 is a configuration diagram of several electronic distance meter embodiments of the present invention set up to find the range distance to a common remote target.

In FIG. 3, a configuration 120 includes a visible constellation of orbiting GPS satellites 122 that transmit range and timing information by microwave radio transmissions to electronic distance meters (EDM) 124, 126, 128 and 130. Each EDM has a view of a target 132 that has a distance "d1" to EDM 124, a distance "d2" to EDM 126, a distance "d3" to EDM 128, and a distance "d4" to EDM 130. Each EDM 124, 126, 128 and 130 computes its own exact position using GPS navigation satellite methods and optically measures the respective distances d1, d2, d3, and d4 to the target 132. The position of the target 132 is determined by solutions of equations, using techniques well known in the GPS arts, using the measurements for the distances d1, d2, d3, and d4, and the positions determined for each of EDM 124, 126, 128, and 130. Such information may be communicated to any one of the EDM's 124, 126, 128, and 130 for such calculation of the position of target 132, or communicated by each EDM 124, 126, 128, and 130 to a remote computer, e.g., by radio service. Since each EDM 124, 126, 128, and 130 is in sight of the same target 132, it is practical to communicate such position information by phase modulation of each beam of light 18 by each respective modulator 34. Conventional DSP units included in commercial GPS navigation receivers ordinarily use well known data demodulation technique to extract almanac and ephemeris information from the PRN code transmitted by each GPS satellite.

Figure 4:
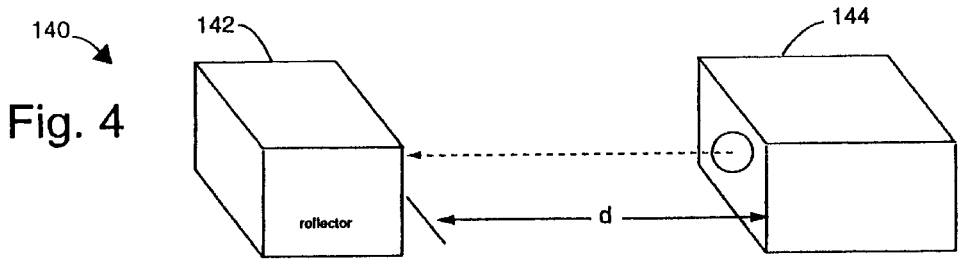
FIG. 4 is a configuration diagram of a reflector and electronic distance meter embodiment of the present invention.

In FIG. 4, a configuration 140 comprises a reflector 142, which can be a corner-cube type, separated from an electronic distance meter (EDM) 144 of the present invention by a distance "d". Such a system 140 could be used for a collision avoidance system for vehicles on the highway. Vehicles in the United States universally have highly-reflective license plates mounted to the rear which would be particularly effective in returning light to the EDM 144. In such a case, it may be enough to determine the separation distance "d" to within a foot or two, the velocity, or change in velocity may also be of interest in such an application. It is therefore important that such distance determinations be updated very frequently, e.g., more than ten times a second. The configuration 140 would useful to warn a driver of the car equipped with EDM 144 of an unsafe distance to a reflector 142 or an unsafe rate of closure of the distance "d".

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An electronic distance meter (EDM), comprising:
   a first light emitter providing for the illumination of a first distant target with a first beam of light;
   a first light detector providing for the reception and detection of light reflected from said first distant target;
   a satellite navigation receiver connected to provide a one-pulse-per-second (1-PPS) output for a derivative clock synchronized to an atomic clock in conventional orbiting global positioning system (GPS) satellites, and outputting a precision timing base;
   a first modulator connected to the first light emitter providing for modulation of said first beam of light with a first pseudo-random number (PRN) modulation signal having a first characteristic PRN code sequence; and
   a first digital signal processor (DSP) connected to receive both said precision timing base and a first detected-light input signal from the first light detector and having range computer means for code correlation and code-phase locking onto said first detected-light input signal and for determining a first distance to said first target based on the difference in phase of said first detected-light input signal and said first PRN modulation signal, given the speed of light through an interim medium to said target object;
   wherein, the first modulator drives the first light emitter according to a pseudo-random number (PRN) code sequence that mimics one of the PRN codes transmitted by conventional orbiting global positioning system (GPS) satellites and includes at least one of a coarse acquisition (C/A) code having a code length of 1023 chips transmitted at a rate of 1.023 Mbits/sec., and a precision (P) code having a code length of $5^{10}$ chips transmitted at a rate of 10.23 Mbits/sec; and
   wherein, the first digital signal processor (DSP) resolves a time-of-flight delay "t" to said first distant target to within tens of picoseconds.

2. The EDM of claim 1, further comprising:
   an automatic gain control (AGC) connected to receive a sample of the magnitude of said first detected-light input signal and connected to control an output level of the first light emitter and providing for a constant level of said first detected-light input signal.

3. The EDM of claim 1, further comprising:
   a first lens disposed in said first beam of light for focusing on said first distant target;
   a color filter disposed in said first beam of light for narrowing the bandwidth of said first beam of light;
   a second lens disposed in front of the first photodetector for collecting said reflected light from said first distant target; and
   a color filter disposed between the first photodetector and said first distant target and providing for the selection of said first beam of light and the exclusion of other light.

4. The EDM of claim 1, further comprising:
   a second light emitter providing for the illumination of a second distant target with a second beam of light;
   a second light detector providing for the reception and detection of light reflected from said second distant target;
   a second modulator connected to the second light emitter providing for amplitude modulation of said second beam of light with a second pseudo-random number (PRN) modulation signal having a second characteristic PRN code sequence that is different from said first; and
   a second digital signal processor (DSP) connected to provide said PRN code sequence to the modulator and connected to receive a second detected-light input signal from the second light detector and having range computer means for code correlation and code-phase locking onto said second detected-light input signal and for determining a second distance to said second target based on the difference in phase of said second detected-light input signal and said second PRN modulation signal, given the speed of light through an interim medium to said target object.

5. The EDM of claim 1, wherein:

the first light emitter, first light detector, first modulator, and first digital signal processor are all mounted on a moving vehicle and provide an operator warning of an unsafe distance to said first distant target.

6. An electronic distance meter (EDM), comprising:

a laser light source for directing an incident beam of light on a reflective target;

an optical detector for detecting any reflected light that may be returned from said reflective target;

a laser-light modulator connected to impress a pseudorandom number (PRN) sequence on said incident beam of light using a direct sequence spread spectrum (DSSS) method;

a DSSS despreader and correlator for detecting said PRN sequence in said reflected light and for determining an amount of PRN code phase delay that occurred during a round-trip to said reflective target;

a precision reference clock used to pace said PRN sequence and to measure said PRN code phase delay; and a satellite navigation receiver connected to discipline the precision reference clock, wherein a basic measurement accuracy of said PRN code phase delay is based on atomic clocks in orbiting navigation satellites.

* * * * *